(12) United States Patent
Galic et al.

(10) Patent No.: US 9,943,762 B2
(45) Date of Patent: Apr. 17, 2018

(54) GAME REWARDS BASED ON DEVICE CHARACTERISTICS

(71) Applicant: Big Fish Games, Inc., Seattle, WA (US)

(72) Inventors: Steven Galic, Seattle, WA (US); John Frederick Comstock, Seattle, WA (US); John Amos Starin, Kirkland, WA (US); Noah Kanter, Seattle, WA (US); Michael Byrd, Seattle, WA (US)

(73) Assignee: Big Fish Games, Inc., Seattle, WA (US)

( * ) Notice: Subject to any disclaimer, the term of this patent is extended or adjusted under 35 U.S.C. 154(b) by 558 days.

(21) Appl. No.: 14/523,743

(22) Filed: Oct. 24, 2014

(65) Prior Publication Data

US 2016/0114251 A1 Apr. 28, 2016

(51) Int. Cl.
| | |
|---|---|
| *A63F 13/00* | (2014.01) |
| *A63F 13/69* | (2014.01) |
| *A63F 13/40* | (2014.01) |
| *A63F 13/424* | (2014.01) |
| *A63F 13/65* | (2014.01) |
| *A63F 13/217* | (2014.01) |
| *A63F 13/42* | (2014.01) |
| *A63F 13/30* | (2014.01) |

(52) U.S. Cl.
CPC ............ *A63F 13/69* (2014.09); *A63F 13/217* (2014.09); *A63F 13/30* (2014.09); *A63F 13/40* (2014.09); *A63F 13/42* (2014.09); *A63F 13/424* (2014.09); *A63F 13/65* (2014.09); *A63F 2300/6018* (2013.01); *A63F 2300/6063* (2013.01); *A63F 2300/6072* (2013.01)

(58) Field of Classification Search
CPC .......... A63F 13/40; A63F 13/42; A63F 13/65; A63F 13/217
See application file for complete search history.

(56) References Cited

U.S. PATENT DOCUMENTS

| | | | | |
|---|---|---|---|---|
| 6,227,966 | B1 * | 5/2001 | Yokoi | A63F 13/005 |
| | | | | 446/143 |
| 6,743,104 | B1 * | 6/2004 | Ota et al. | A63F 13/02 |
| | | | | 463/37 |
| 6,893,347 | B1 * | 5/2005 | Zilliacus | A63F 13/12 |
| | | | | 463/29 |
| 7,627,680 | B2 * | 12/2009 | Hutcheson | A63F 13/34 |
| | | | | 709/219 |
| 2003/0228880 | A1 * | 12/2003 | Shimamura et al. | H04M 1/021 |
| | | | | 455/550.1 |
| 2005/0085297 | A1 * | 4/2005 | Onoda | A63F 13/10 |
| | | | | 463/37 |

(Continued)

Primary Examiner — Steven J Hylinski
(74) Attorney, Agent, or Firm — Lee & Hayes, PLLC (57) ABSTRACT

A reward associated with a game may be provided based at least partly on a characteristic associated with a user device used to play the game. A threshold or level associated with the device characteristic may be determined. A current level of the characteristic while a user is playing the game via the user device may be determined. Based at least partly on a determination that the current level of the characteristic satisfies the threshold or the level during play of the game, a reward associated with the game may be provided to the user device and/or the user.

20 Claims, 5 Drawing Sheets

(56) References Cited

U.S. PATENT DOCUMENTS

| | | | |
|---|---|---|---|
| 2005/0220044 A1* | 10/2005 | Choi | A63F 13/10 370/310 |
| 2007/0066395 A1* | 3/2007 | Harris | A63F 13/10 463/39 |
| 2007/0094519 A1* | 4/2007 | Yamamoto | G06F 1/3203 713/300 |
| 2010/0040240 A1* | 2/2010 | Bonanno | A63F 13/02 381/74 |
| 2012/0162397 A1* | 6/2012 | Terunuma | H04N 13/0048 348/51 |
| 2015/0224400 A1* | 8/2015 | Goslin | A63F 13/65 463/24 |

* cited by examiner

GAME REWARDS BASED ON DEVICE CHARACTERISTICS

BACKGROUND

With the growing popularity of casual gaming, consumers are able to play various types of games utilizing different mediums, including computing devices, tablet devices, mobile telephones, etc. Typically, overall goals of the games include obtaining a predetermined score, passing one or more levels, achieving a particular objective, and so on. Once a user achieves a goal, the user may seek to again achieve that same goal or to attempt to achieve a different goal with respect to the game.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

This disclosure describes systems and processes for facilitating play of a game in which game rewards are provided to a user (or a user account/profile associated with the user) during play of the game. More particularly, the game rewards are awarded to the user based at least partly on characteristics associated with a user device being used to play the game. In certain embodiments, the game may have a game mechanic that monitors and/or determines certain aspects or characteristics of the user device, such as battery consumption of the user device and/or a volume level of the user device, for example. The systems and processes described herein may determine levels or thresholds in which rewards associated with the game are awarded to the user. During play of the game, if a device characteristic meets or exceeds such predetermined levels or thresholds, the systems and processes described herein may provide the awards to the user. In various embodiments, the type or extent of the rewards may be dependent upon the particular device characteristic and/or the particular level/threshold that is being satisfied.

For instance, game rewards may be provided to the user based at least partly on a battery consumption of a user device (used to play the game) while the user is playing the game. More particularly, the systems and processes described herein may identify predetermined battery levels or thresholds (e.g., percent of battery consumed, percent of battery remaining, etc.) in which various rewards may be awarded. The battery level of the user device may be monitored during play of the game. Then, if the battery level of the user device is determined to be at or below a certain battery level (e.g., 10%, 5%, etc.), a particular reward may be provided to the user. The type or amount of the reward may be based on the particular battery level that is reached, meaning that a first reward may be provided as a result of the battery level being reduced to 10% and that a second, different reward may be provided as a result of the battery level being reduced to 5%. In some embodiments, factors that may cause the battery of the user device to decrease (e.g., activating applications, increased screen brightness, wireless connectivity, extent of interaction with the game, increased graphics processing, etc.) may also be considered when providing rewards based on battery consumption of the user device.

As another example, rewards may be provided to the user based on the volume level of the user device while the user is playing the game. That is, the user may adjust a volume setting of the user device during play of the game, which may cause sound to be output by speakers of the user device and/or by speakers that are separate from the user device (e.g., headphones, stereo receiver, etc.). In some embodiments, the user may be provided with a reward if the volume of the user device is turned on during play of the game, if the volume of the user device is increased during play of the game, and/or if the current volume of the user device meets or exceeds a predetermined level or threshold during play of the game. As a result, the systems and processes described herein may consider characteristics of the user device being used to play the game and provide rewards to the user based on those characteristics to incentivize users to play the game and/or to continue playing the game.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Figure 1:
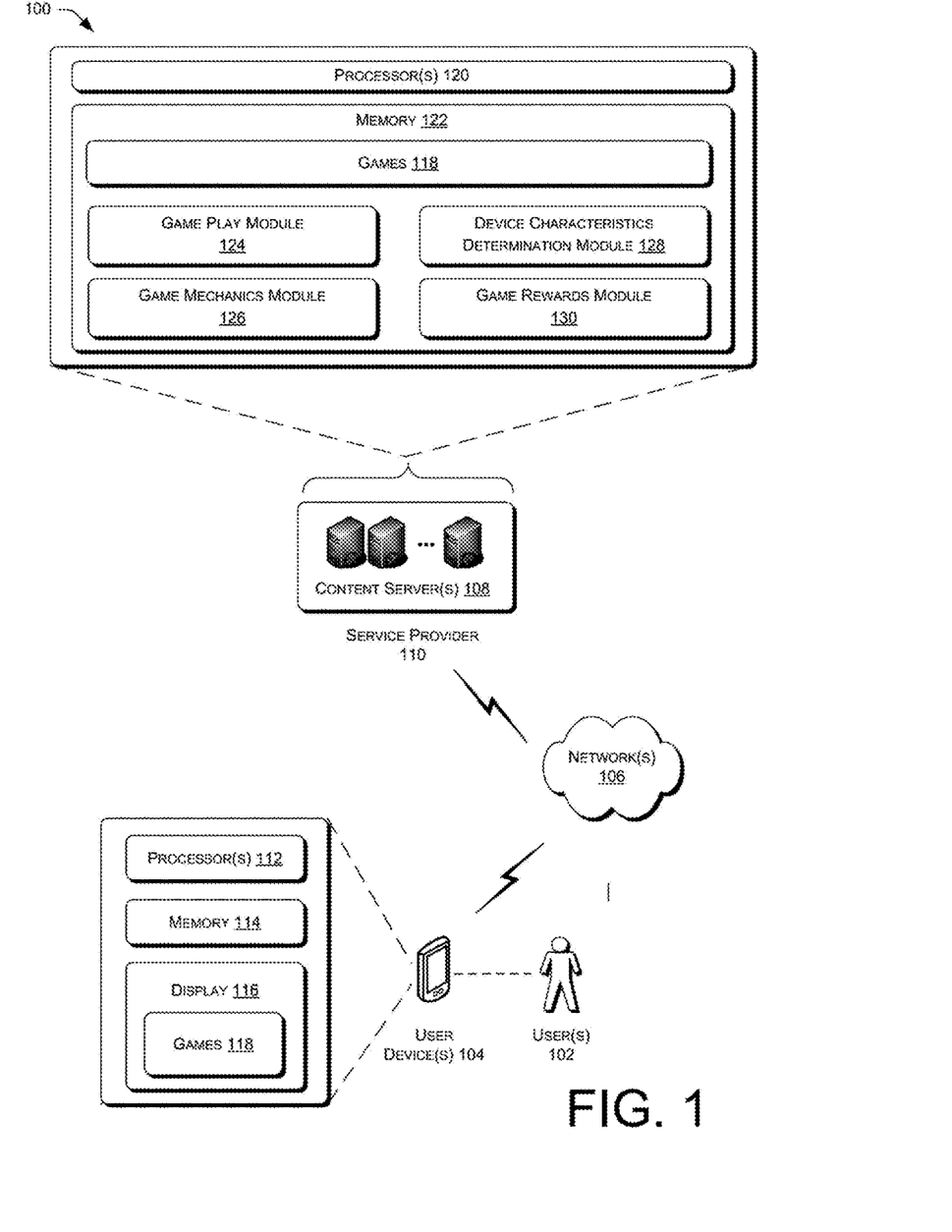
FIG. 1 is a diagram showing an example system including various components that allow a user to play a game that provides rewards based on characteristics associated with a user device used to play the game.

FIG. 1 illustrates an architecture 100 in which a user 102 may electronically or physically access games 118 (e.g., software games, casual games, physical games, games played for real or virtual currency, games of chance, etc.) and play those games 118, such as via a user device 104. As described below, the user device 104 may be implemented in any number of ways, such as a computer, a laptop computer, a tablet device, a personal digital assistant (PDA), a multi-functioning communication device, and so on. The user 102 may access the games 118 over a network 106, such as the Internet, which may be communicatively coupled to one or more content server(s) 108 associated with a service provider 110. The content server(s) 108 may store various types of games 118, such as software games, and other content that is accessible by the user device 104 (e.g., media content, audio content, video content, etc.). For instance, the user 102 may access and/or play the games 118 via one or more sites (e.g., a website) that are accessible via the network(s) 106 and/or via an application associated with the user device 104. The games 118 may also be physically stored on the user device 104 of the user 102 or streamed to the user device 104 via the network(s) 106. One or more processor(s) 112, a memory 114, and a display 116 of the user device 104 may enable the user 102 to access and/or play the games 118.

Furthermore, one or more processor(s) 120 and a memory 122 of the content server(s) 108 may allow the content server(s) 108 to enable the users 102 to earn rewards associated with the games 118 based on one or more characteristics of the user device 104 being used to play the games 118. More particularly, the user's 102 ability to play the games 118 and to earn such rewards may be a result of operations and/or processes performed by various modules stored in the memory 122, such as a game play module 124, a game mechanics module 126, a device characteristics determination module 128, and/or a game rewards module 130. Although, various modules are illustrated in FIG. 1, any number of modules may be utilized, and such modules may be stored in the memory 122 of the content server(s) 108 and/or the memory 114 of the user device(s) 104.

For the purposes of this discussion, the games 118 may include physical games 118 and games 118 that may be played online or via a user device 104. Moreover, the games 118 may be played for real currency (e.g., U.S. dollars) or virtual currency (e.g., points, chips, tokens, etc.). The games 118 may also relate to games of chance or casual gaming, which may include physical games, online games that may be played over the network(s) 106, and/or software games that may be stored on, and/or be accessible by, the user device 104.

Games of chance may refer to games in which the outcome is at least partly random or is influenced at least in part by a randomizing device. In games of chance, the players may elect to wager real or virtual currency, or anything of monetary value, prior to at least a portion of the game being played (e.g., spinning a set of reels). Examples of games of chance may include physical games, games played via a network 106, or games played via a user device 104, such as dice games, spinning tops, playing cards, slot machines, roulette wheels, and many other casino games. A game of chance may have some skill element, although the chance or randomness of the game may play a greater role in determining the outcome of the game. In other games of chance, a certain degree of skill may enhance a player's performance with respect to the game. This may be the case where the player(s) make game decisions based upon previous or incomplete knowledge, such as in various casino or card games (e.g., blackjack, poker, etc.).

Casual games may include games (e.g., video games) that are associated with any type of gameplay and any type of genre. Casual games may have a set of simple rules that allow a large audience to play, such as games that may be played utilizing a touch-sensitive display, a telephone keypad, a mouse having one or two buttons, etc. Moreover, casual games may not require a long-term commitment or unique skills to play the game, thus allowing users 102 to play the game in short time increments, to quickly reach a final stage of the game, and/or to continuously play the game without needing to save the game. Casual games may also be played on any medium, including personal computers, game consoles, mobile devices (e.g., mobile telephone, tablet devices, etc.), etc., and may be played online via a web browser. Casual games may be referred to as "casual" since the games may be directed towards consumers who can come across the game and get into gameplay in a short amount of time, if not immediately. Examples of casual games may include puzzle games, hidden object games, adventure games, strategy games, arcade and action games, word and trivia games, casino games, and/or card and board games.

Other games 118 may first be downloaded to and/or installed on the user device 104 and/or an application associated with the user device 104. These games 118, and the physical games, the games of chance (including physical and virtual games), and the casual games 118 described above, may also be acquired by the user 102. Regardless of whether the games 118 are stored on the user device 104 or the content server(s) 108, playing the games 118 may include accessing, viewing, trying, and/or otherwise interacting with the games 118.

The users 102 may access the games 118 in any of a number of different manners. For instance, the users 102 may play the games 118 in a physical setting (e.g., physical slot machines, card games, etc.). The users 102 may also access a site (e.g., a website) associated with an entity, such as the service provider 110 or a merchant, that provides access to the games 118. Such a site may be remote from the user device 104 but may allow the users 102 to interact with the games 118 via the network(s) 106. Moreover, the users 102 may download one or more applications to the user device 104 in order to access the games 118. In this case, the content server(s) 108 (via the service provider 110) may provide, transmit, suggest, and/or recommend the games 118 to the user device 104, whereby the users 102 may interact with the games 118 via the downloaded application(s). In other embodiments, the games 118 may be streamed from the content server(s) 108 via the service provider 110 to the user device 104 such that the users 102 may interact with the games 118 in real-time (or near real-time). Once the user 102 accesses the games 118, the users 102 may perform a variety of actions, including learning about the games 118, viewing the games 118, trying the games 118, acquiring (e.g., purchasing, renting, leasing, etc.) the games 118, downloading/installing the games 118 to the user device 104, and/or playing the games 118.

Additionally, the users 102 may have a user account or user profile associated with the entity (e.g., the service provider 110) that provides and/or provides access to the games 118. For instance, assuming that the games 118 are available via a website, each of the users 102 may have a user account or user profile that specifies various types of information relating to the users 102. This information may include personal information, user preferences, and/or some user identifier (ID), which may be some combination of characters (e.g., name, number, etc.) that uniquely identifies the user 102 from other users 102.

In some embodiments, the user device 104 may be any type of device that is capable of receiving, accessing, playing, and/or otherwise interacting with the games 118, such as, for example, a personal computer, a laptop computer, a cellular telephone, a personal digital assistant (PDA), a tablet device, an electronic book (e-Book) reader device, a television, a game console, or any other device that may be used to access games 118 that may be viewed, tried, played, downloaded, installed, and/or acquired by the user 102. For instance, the user 102 may utilize the user device 104 to access and navigate between one or more sites, such as web sites, web pages related thereto, and/or documents or content associated with those websites or web pages that may be of interest to the user 102. For instance, the user 102 may utilize the user device 104 to access sites to view, play, and/or download the games 118. Further, the user device 104 shown in FIG. 1 is only one example of a user device 104 and is not intended to suggest any limitation as to the scope of use or functionality of any user device 104 utilized to perform the processes and/or procedures described herein. Although the games 118 may be played via the user device 104, certain games 118 may be played without the use of a user device 104. For example, various physical games and/or games of chance (e.g., slot machines, table top games, etc.) may be played in a physical setting without use of such user devices 104.

In certain embodiments, the service provider 110 may be entity that enables the users 102 to play the games 118 via corresponding user devices 104. For instance, the service provider 110 may maintain the games 118 such that the games 118 may be transferred to (e.g., stored on) the user devices 104 and/or streamed to the user devices 104 via the network(s) 106. In other embodiments, the service provider 110 may enable the users 102 to access the games 118 via an application that is associated with the service provider 110 and that may be downloaded to the user devices 104. The service provider 110 may also provide access to the games 118 on behalf of another entity, such as an entity that manufactures, distributes, and/or sells the games 118.

The processor(s) 112 of the user device 104 may execute one or more modules and/or processes to cause the user device 104 to perform a variety of functions, as set forth above and explained in further detail in the following disclosure. In some embodiments, the processor(s) 112 may include a central processing unit (CPU), a graphics processing unit (GPU), both CPU and GPU, or other processing units or components known in the art. For instance, the processor(s) 112 may allow the user device 104 to access sites associated with games 118 and/or download applications that are used to access and/or play the games 118. Additionally, each of the processor(s) 112 may possess its own local memory, which also may store program modules, program data, and/or one or more operating systems.

In at least one configuration, the memory 114 of the user device 104 may include any component that may be used to access, play, and/or download the games 118. Depending on the exact configuration and type of the user device 104, the memory 114 may also include volatile memory (such as RAM), non-volatile memory (such as ROM, flash memory, miniature hard drive, memory card, or the like) or some combination thereof.

In various embodiments, the user device 104 may also have input device(s) such as a keyboard, a mouse, a pen, a voice input device, a touch input device, etc. The user device 104 may also include the display 116 and other output device(s), such as speakers, a printer, etc. The user 102 may utilize the foregoing features to interact with the user device 104 and/or the content server(s) 108 via the network(s) 106. More particularly, the display 116 of the user device 104 may include any type of display known in the art that is configured to present (e.g., display) information to the user 102. For instance, the display 116 may be a screen or user interface that allows the user 102 to access, play, and/or download the games 118. Further, one or more local program modules may be utilized to play the games 118 on a browser. The local program modules may be stored in the memory 114 and/or executed on the processor(s) 112 in order to present graphics associated with the games 118 on the display 116.

In some embodiments, the network(s) 106 may be any type of network known in the art, such as the Internet. Moreover, the user device 104 and the content server(s) 108 may communicatively couple to the network(s) 106 in any manner, such as by a wired or wireless connection. The network(s) 106 may also facilitate communication between the user device 104 and the content server(s) 108, and also may allow for the transfer of data or communications therebetween. For instance, the content server(s) 108 and/or other entities may provide access to the games 118 that may be accessed, played, and/or downloaded utilizing the user device 104.

In addition, and as mentioned previously, the content server(s) 108 may include one or more processor(s) 120 and a memory 122, which may store the game play module 124, the game mechanics module 126, the device characteristics determination module 128, and/or the game rewards module 130. The content server(s) 108 may also include additional components not listed above that perform any function associated with the content server(s) 108. In various embodiments, the content server(s) 108 may be any type of server, such as a network-accessible server, or the content server(s) 108 may be any entity that provides access to the games 118 that is stored on and/or is accessible by the content server(s) 108.

In various embodiments, the game play module 124 may enable a single user 102 or multiple users 102 to play one or more of the games 118. In particular, the game play module 124 may allow multiple users 102 to play one of the games 118 in a physical setting or a virtual environment. During play of the game, and based at least partly on the performance of the user 102 while playing the game 118 (e.g., points earned, levels passed, objectives achieved, progression through the game 118, etc.), the game play module 124 may provide various rewards to the user 102, or a user account or user profile associated with the user 102. The performance and/or progression of the users 102 may be monitored and displayed to the users 102, where the performance/progression associated with the game 118 may be represented by an amount of points, an amount of currency (e.g., awards, trophies, dollars, chips, prizes, etc.), reaching or passing levels associated with the game 118, unlocking features associated with the game 118, etc.

In additional embodiments, the game mechanics module 126 may determine one or more game mechanics associated with the game 118 that may dictate whether certain rewards are provided to the user 102, the type of rewards provided to the user 102, and/or the extent to which rewards are provided to the user 102. The game mechanics may relate to characteristics of the user device 104 that are being used to play the game 118. Examples of such characteristics may include battery consumption of the user device 104 while the user 102 is playing the game 118 and/or a volume level of the user device 104 while the user 102 is playing the game 118. In addition, the game mechanics module 126 may identify pre-determined levels or thresholds of the device characteristics (e.g., a battery level, a volume level, etc.) that are considered when determining whether game rewards should be awarded to the user 102.

The device characteristics determination module 128 may determine, during play of the game 118, whether a current device characteristic of the user device 104 meets or satisfies a pre-determined level or threshold of the device characteristic. For instance, a game mechanic associated with the game 118 may relate to battery consumption of the user device 104 during play of the game 118. The service provider 110 may determine that the user 102 is to receive certain rewards associated with the game 118 provided that the current battery level of the user device 104 meets or is less than a predetermined battery level or threshold (e.g., 20%, 5%, etc.) during play of the game 118. If the current battery level of the user device 104 decreases to that predetermined battery level or threshold, the device characteristics determination module 128 may determine that the user 102 is to receive the particular reward associated with that predetermined battery level or threshold.

The game rewards module 130 may provide rewards to the user 102 during play of the game 118 upon determining that the current device characteristic of the user device 102 met or satisfied the predetermined level or threshold of the device characteristic. The rewards may be provided to the user 102, to a user account or profile associated with the user 102, and/or to a cumulative amount of rewards obtained while playing the game 118. The rewards may also be associated with the game 118 currently being played and may correspond to points, tokens, trophies, bonuses, an increased rate of rewards, unlocking of game features, and so on. Moreover, whether the game rewards module 130 awards rewards to the user 102 may be dependent upon the particular device characteristic, the device characteristic level that was satisfied, etc.

Figure 2:
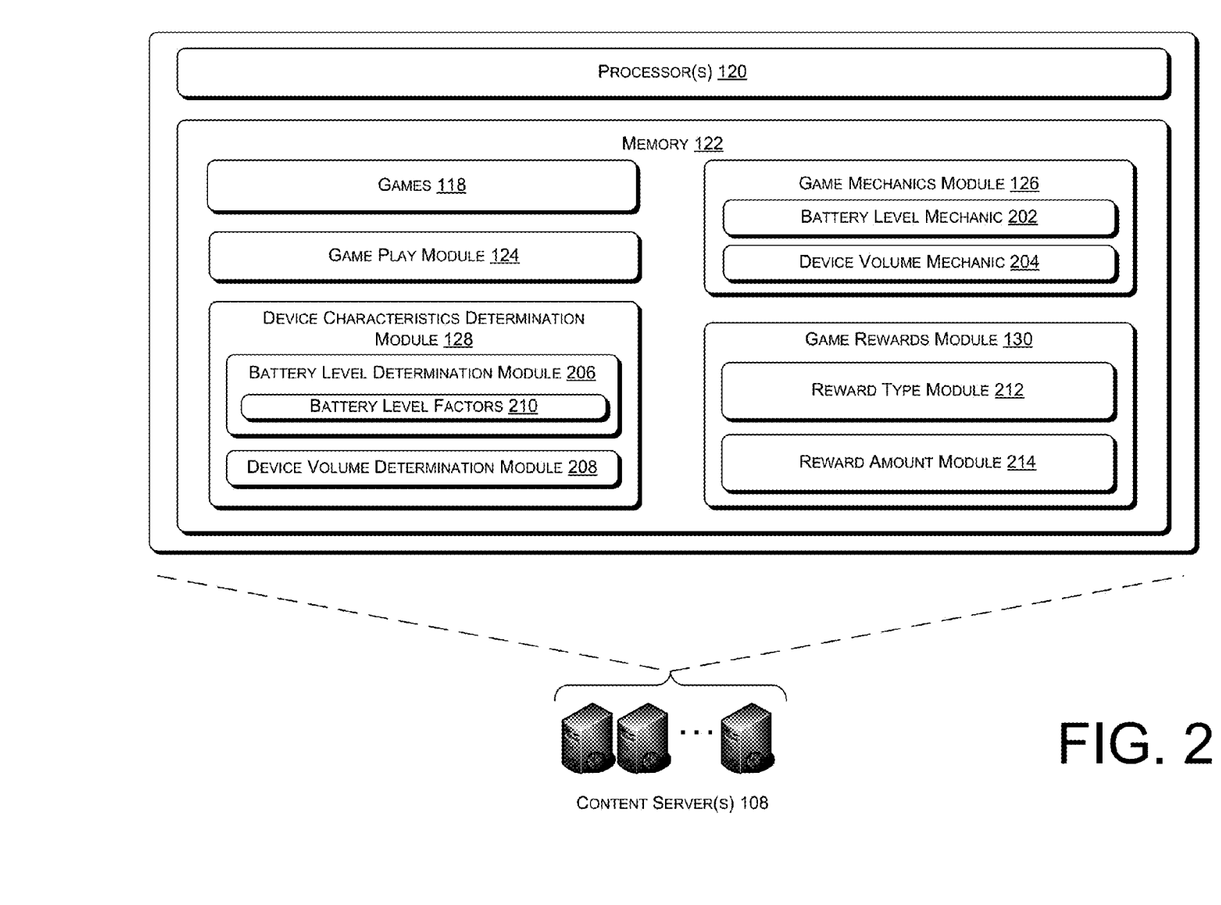
FIG. 2 is diagram showing an example system that includes a content server and various modules used to provide rewards to a user playing a game based on characteristics of a user device during play of the game.

FIG. 2 illustrates an example content server 108 that provides game rewards to a user based at least partly on characteristics of a user device that is being used to play the game. More particularly, the content server(s) 108 as illustrated in FIG. 2 may include the one or more processor(s) 120 and the memory 122, which may maintain or be associated with the games 118, the game play module 124, the game mechanics module 126, the device characteristics determination module 128, and/or the game rewards module 130.

As stated above, the game play module 124 may enable users 102 to play a particular game 118 via a corresponding user device 104. During play of the game 118, the user 102 may earn rewards (e.g., points, tokens, bonuses, unlocking of game features, etc.) as a result of a performance of the user 102 while playing the game 118. The rewards earned during play of the game 118 may be added to a cumulative amount of rewards previously earned by the user 102, or may be associated with a user account or user profile associated with the user 102. In certain embodiments, the rewards earned during play of the game 118 may be based on characteristics or features of the user device 104 while the user 102 is playing the game 118 via the user device 104. That is, the current status of device characteristics and/or features may determine whether rewards are provided to the user 102 playing the game 118.

In various embodiments, the game mechanics module 126 may cause a game 118 to have various game mechanics that are associated with the characteristics or features of the user device 104. For the purposes of this discussion, the game mechanics may be software and/or computer-executable instructions that are integrated within the game 118 or that are remote from the game 118, such as being stored by the content server(s) 108. Moreover, the game 118, which may include the game mechanics, may be stored on the user device 104, such that the game mechanic may determine and/or monitor the characteristics and/or features of the user device 104. The game mechanics may cause the user 102 that is playing the game 118 to earn rewards, or an increased amount of rewards, based on the characteristics/features of the user device 104. In addition, the game mechanics may cause the user 102 to receive a lesser amount (or no) rewards based on the characteristics/features of the user device 104.

As shown in FIG. 2, the game mechanics module 126 may include a battery level mechanic 202 and a device volume mechanic 204. In various embodiments, the battery level mechanic 202 of the game 118 may cause a user 102 to earn rewards while playing the game 118 via a user device 104 based on the battery consumption of the user device 104. That is, the user 102 may earn various rewards as a result of the current battery level of the user device 104 meeting, or decreasing below, a predetermined battery level or threshold (e.g., 10% of the battery remaining, 5% of the battery remaining, etc.) while the user 102 is playing the game 118 via the user device 104. Moreover, the rewards earned by the user 102 may vary based on the particular battery level, such that the user 102 may earn additional or different rewards when the current battery level decreases to 5%, as opposed to the current battery level decreasing to 10%. Greater rewards may be provided to the user 102 at lower battery levels since it may become more risky to play the game 118 when the user device 104 has a lower battery level. That is, the user device 104 is more likely to power off (due to no remaining battery) while the user 102 is currently playing the game 118 when the current battery level is at a lower level. If that were to occur, the user 102 would no longer be able to play the game 118 via that user device 104 until the battery was charged or user device 104 was connected to a power source.

In various embodiments, the game mechanics module 126 may identify thresholds or levels associated with the device characteristics of the user device 104. When those thresholds or levels are satisfied while the user 102 is playing the game 118 via the user device 104, the user 102 may earn various rewards. For instance, the battery level mechanic 202 may identify various battery levels or thresholds of the user device 104. The battery levels or thresholds may correspond to an amount of battery remaining (e.g., 20% remaining, 10% remaining, 5% remaining, etc.), an amount of battery that has been consumed (e.g., 80% consumed, 90% consumed, 95% consumed, etc.), an amount of time remaining until the battery has no charge (e.g., 10 minutes, 5 minutes, 1 minute, etc.), and so on. Provided that the current battery level of the user device 104 reaches one of the battery levels or thresholds while the user 102 is playing the game 118, the user 102 may earn various rewards. The rewards that are provided to the user 102 may vary based on the particular battery level or threshold that has been reached. For example, the user 102 may receive more significant rewards, or the rewards may be awarded more frequently, when lower battery levels or thresholds are reached, thus providing the user 102 additional incentives to continue playing the game 118 via the user device 104 despite the user device 104 having a relatively low amount of battery remaining.

In various embodiments, the battery level mechanic 202 may determine whether the battery of the user device 104 is currently charging, such as by being plugged into a power source (e.g., an outlet). The battery level mechanic 202 may make such a determination via the operating system of the user device 104. If the battery of the user device 104 is not currently being charged, the user 102 may be eligible to receive rewards as a result of the battery level of the user device 104 reaching a predetermined level or threshold while the user 102 is playing the game 118 via the user device 104. For example, the user 102 may receive a particular reward if he/she plays the game 118 when the current battery level of the user device 104 reaches 5% remaining. However, the user 102 may know that he/she will earn additional or enhanced rewards if he/she continues playing the game 118 and if the battery level of the user device 104 reaches 1%. As a result, the user 102 may continue to play the game 118 for the purpose of earning such a reward, while sacrificing performing other actions on the user device 104 (e.g., making telephone calls, using applications, sending text messages, etc.) that would also drain the remaining battery.

Moreover, the device volume mechanic 204 may determine volume levels of the user device 104 that, when met while playing the game 118 using the user device 104, cause the user 102 to receive various rewards. For instance, the device volume mechanic 204 may cause the user 102 to receive a reward when the user 102 adjusts a volume setting of the user device 104, such as the user 102 turning on the volume of the user device 104 while playing the game 118. As a result, the user device 104 may output sound associated with the game 118. In other embodiments, the user 102 may receive rewards as a result of the user 102 adjusting the volume setting of the user device 104, such as by increasing the volume of the user device 104 when the user 102 is playing the game 118 via the user device 104. Increasing the volume setting may cause speakers of the user device 104 to output an increased amount of sound. In certain embodiments, the rewards provided to the users 102 may vary for turning on the volume of the user device 104 or increasing the volume to different volume levels. The service provider 110 may determine that users 102 are more engaged with respect to the game 118, play the game 118, for longer periods of time, spend more money on the game 118, etc., when the volume of the user device 104 is turned on or when the volume of the user device 104 is at higher levels. Therefore, the service provider 110 may incentivize users 102 to either turn on, or increase, the volume of the user device 104 during game play by providing game rewards to the users 104 for taking such actions during game play.

In additional embodiments, the device characteristics determination module 128 may cause or enable the game mechanics to determine the current level of the characteristics/features of the user device 104 while the user 102 is playing a game 118 via the user device 104. If the current level of a particular characteristic/feature of the user device 104 satisfies a predetermined level/threshold for that characteristic/feature during play of the game 118, the user 102 may receive a particular reward. Moreover, the type or amount of the reward may vary depending on the particular device characteristic and/or on which predetermined level/threshold is satisfied.

More particularly, the device characteristics determination module 128 may include a battery level determination module 206 and a device volume determination module 208. In various embodiments, the battery level determination module 206 may maintain, or be associated with one or more battery level factors 210. The battery level determination module 206 may determine the current battery level of the user device 104 while the user 102 is playing the game 118. For instance, the current battery level of the user device 104 may correspond to an amount of battery remaining or an amount of battery consumed, which each may be represented by a percentage, ratio, or another battery level indicator. The current battery level of the user device 104 may also indicate an amount of time remaining before the battery will be fully consumed, which may cause the user device 104 to power down.

Upon determining the current battery level of the user device 104 during play of the game 118, the battery level determination module 206 may determine whether the current battery level satisfies a predetermined battery level or threshold associated with the user device 104. If so, the user 102 may receive some type of reward as a result. For example, the service provider 110 may provide rewards to a user 102 if the user 102 is playing the game 118 when the current battery level of the user device 104 is at or drops below 20%, 10%, 5%, and/or 1%. That is, during play of the game 118, if the current battery level of the user device 104 is at or below 20%, the user 102 may receive a first reward. Moreover, if the user 102 continues to play the game 118 and the current battery level of the user device 104 is at or below 10%, the user 102 may again receive a second reward, which may be the same or different from the first reward. The user 102 may continue to receive additional game rewards provided that the current battery level of the user device 104 reaches additional battery levels/thresholds (e.g., 5%, 1%, 0%, etc.) of the user device 104 while the user 102 is playing the game 118 via the user device 104.

In addition to the current battery level of the user device 104, certain battery level factors 210 may be considered when determining whether various game rewards should be provided to the user 102. Some or all of the battery level factors 210 may correspond to characteristics/features of the user device 104 and/or may correspond to battery consumption of the user device 104 while the user 102 is playing the game 118. More particularly, the user 102 may receive rewards while playing the game 118 if the use 102 performs other activities or operations that may impact battery consumption of the user device 104 being used to play the game 118. In addition, performing such activities/operations with respect to the user device 104 may cause the battery of the user device 104 to be consumed at a faster rate. As a result, the current battery level of the user device 104 during play of the game 118 may reach predetermined battery levels/thresholds at an earlier time, which may allow the user 102 to receive corresponding rewards at an earlier time.

For instance, the user 102 interacting with various applications residing on the user device 104 may cause the battery of the user device 104 to be consumed (e.g., reduced) at a greater rate. Assume that the user 102 knows that he/she will receive a reward when the battery level of the user device 104 reaches 20%, and that the current battery level of the user device 104 is 40%. In order to reach that battery level threshold/level, in addition to playing the game 118, the user 102 may activate or interact with (e.g., open) applications residing on the user device 104, which may cause the battery level of the user device 104 to decrease at a faster rate. Consequently, provided that the battery level decreases at a more rapid rate, the user 102 may receive the reward corresponding to the 20% battery threshold at an earlier time.

Another battery level factor 210 that may impact battery consumption of the user device 104 is the user 102 taking photographs or video utilizing the user device 104. In some embodiments, the user device 104 may include a camera that is configured to capture photographs (e.g., still image photographs) and/or video. Capturing such media, during play of the game 118 may cause the battery level of the user device 104 to decrease at a faster rate. The user 102 consuming media content during play of the game 118 may also reduce the battery level of the user device 104. For instance, the user 102 may view video content or images, which may include video/images captured by the user device 104, or listen to audio files (e.g., music), while playing the game 118.

In addition, a battery level factor 210 that may impact battery consumption of the user device 104 may include a screen brightness of the user device 104. That is, increasing the screen brightness of the user device 102 may cause the battery level of the user device 104 to decrease at a faster rate. As a result, the user 102 may increase the screen brightness during play of the game 118 in order to decrease the battery level of the user device 104 at a fast rate. The user 102 may also activate a flashlight, or other lighting mechanisms, associated with the user device 104 in order to consume the battery of the user device 104 at a faster rate. An additional battery level factor 210 may include wireless connectivity of the user device 104. That is, by enabling the user device 104 to connect to wireless networks while the user 102 is playing the game 118, the battery of the user device 104 may be consumed at a faster rate. The user 102 activating, or interacting with, a web browser may also cause an increased reduction of the battery level of the user device 104. Moreover, another battery level factor 210 may include the user 102 interacting with a social network using the user device 104 during play of the game 118, which may be performed via the web browser and/or via one or more applications residing on the user device 104.

The battery level factors 210 may also relate to the particular game 118 that is being played by the user 102 via the user device 104. For instance, the extent to which the user 102 interacts with the game 118 may impact battery consumption of the user device 104. For instance, if the user 102 interacts with the game 118 more frequently, the battery level of the user device 104 may decrease at a faster rate, and vice versa. Moreover, the extent of graphics processing associated with the game 118 may cause an increase in battery consumption of the user device 104. For instance, if the user 102 performs operations with respect to the game 118 that cause the CPU or the GPU to execute an additional amount of instructions, the battery level of the user device 104 may be reduced at a faster rate.

An additional battery level factor 210 may relate to the current location of the user device 104, whether the user device 104 is currently moving, and/or the rate of movement, which may be determined using any location detection technology (e.g., GPS, via an application residing on the user device 104, etc.). For instance, depending on the current physical location of the user device 104, the service provider 110 may determine that the user 102 would be unable to plug in and charge his/her user device 104. Moreover, a determination that the user device 104 is moving may also indicate that the user 104 is unable to charge the battery of his/her user device 104. However, if the rate of movement of the user device 104 is relatively high, the service provider 110 may determine that the user 102 is traveling in an automobile, train, etc. In those circumstances, the user 102 may be able to charge the battery of his/her user device 104.

Although numerous battery level factors 210 are identified herein, any characteristic or feature associated with the user device 104 that may cause the battery level of the user device 104 to be reduced at a faster rate may be considered a battery level factor 210.

The device volume determination module 208 may determine the current volume level of the user device 104 while the user 104 is playing the game 118 via the user device 104. The device volume determination module 208 may also determine whether the current volume level of the user device 104 meets or exceeds a predetermined volume level for the user device 104. If so, the user 102 playing the game 118 may receive a reward. For instance, the volume threshold or level corresponds to the volume of the user device 104 being turned on during game play. In this scenario, if it is determined that the user 102 turned on the volume of the user device 104 while playing the game 118, the user 102 may receive a reward. In addition, the volume threshold or level may correspond to a predetermined volume level of the user device 104. If it is determined during game play that current volume level of the user device 104 is at or above the predetermined volume level, or if it determined that the user 102 increased the volume of the user device 104 to (or above) the predetermined volume level, the user 102 may receive a reward. The rewards provided to the user 102 may vary based on whether the user 102 turned on the volume of the user device 104 and/or the particular predetermined volume level that was satisfied.

In addition to determining a current volume level or a current battery level of the user device 104, the systems and/or processes described herein may also determine the rate at which those levels are adjusted. For instance, the modules of the user device 104 may measure the rate of change of the battery level, such as the rate at which the battery of the user device 104 is being charged or drained. With respect to the user 102 adjusting the volume of the user device 104, the rate at which the volume of the user device 104 is adjusted by the user 102 may be determined (e.g., measured). The device characteristics determination module 128 may determine whether the rate at which the battery level is being adjusted is at, below, or above a particular threshold. The device characteristics determination module 128 may also determine whether the rate at which the volume of the user device 104 is being adjusted is at, below, or above a threshold.

As a result of a current device characteristic of the user device 104 satisfying a predetermined threshold or level for that device characteristic, the game rewards module 130 may provide one or more game rewards to the user 102 that is playing the game 118. As shown in FIG. 2, the game rewards module 130 may include a reward type module 212 and a reward amount module 214.

In various embodiments, the reward type module 212 may determine the type of rewards that are to be provided to users 102. For instance, the game rewards may include any amount of points, tokens, bonuses, trophies, or any other type of value associated with the game 118. Such rewards may be added to a cumulative amount of rewards that have been previously earned by the user 102, or may be associated with a user account or a user profile associated with the user 102. In certain embodiments, the game reward may correspond to a multiplier, which may double, triple, etc., rewards earned by the user 102 or rewards yet to be earned by the user 102. The multiplier may also increase the rate in which the user 102 receives rewards. In other embodiments, the rewards may include one-time bonuses for achieving certain objectives, such as the current battery level of the user device 104 decreasing to 20% remaining. In addition, the rewards may correspond to the unlocking of certain game features (e.g., levels, game characters, etc.) that were previously unavailable or inaccessible to the user 102.

Moreover, the reward amount module 214 may determine an extent and/or an amount of rewards to be provided to users 102. In various embodiments, the rewards that are provided to users 102 may vary based on device characteristic level/threshold that is reached. For instance, with respect to battery consumption of the user device 104, the amount or type of rewards provided to the user 102 may be increased or may become more significant as the battery level of the user device 104 decreases. That is, the reward provided to the user 102 when the battery level reaches 5% may be greater or more significant (e.g., more points, unlocking of more exclusive or rare game features, etc.) than when the battery level reaches 20%. Here, the user 102 is facing a higher risk of the user device 104 powering down due to lack of battery when the battery level is 5%, so the reward provided to the user 102 may be commensurate with that additional risk. In additional embodiments, the reward amount module 214 may provide larger rewards in certain circumstances. For example, the reward amount module 214 may cause the user 102 to receive a large bonus if the user device 104 powers down (due to lack of battery) while the user 102 is playing the game 118 via the user device 104.

As stated above, the device characteristics determination module 128 may determine the rate at which various characteristics of the user device 104 (e.g., current volume level, current battery level, etc.) are being adjusted. The type and extent of rewards that are provided to the user 102 may be based on the particular rate that is determined. For instance, the user 102 may receive more significant rewards if the rate at which the battery level is being reduced is relatively high and/or if the rate at which the volume level is being increased is relatively high. Such rates may indicate that the user 102 is engaged with, or is otherwise enjoying, the game 118 being played. On the other hand, the user 102 may receive less significant or no rewards if the rate at which the battery level is being reduced is relatively low (or if the battery level remains constant or is increasing) and/or if the rate at which the volume level is being increased is relatively low (or if the volume level remains the same or is being decreased). As a result, the rewards that are provided to a user 102 may depend upon the particular rate of change meeting various battery level rate thresholds and/or volume level rate thresholds.

In other embodiments, the rewards provided to users 102 may vary based on the type of user device 104 being used to play the game 118. Since battery usage and consumption is more of a concern for mobile devices, such as mobile telephones or tablet devices, the reward amount module 214 may provide greater or more significant awards when it is determined that the user 102 is playing the game 118 via such a user device 104. On the contrary, the reward amount module 214 may provide fewer or less significant rewards when it is determined that the user 102 is operating a user device 104 that has a longer battery life, such as a laptop computer.

In certain embodiments, the rewards that are to be provided to users 102 may be dependent upon the type of user device 104 and/or the particular user device 104 currently being used to play the game 118. For instance, the service provider 110 may determine a baseline rate of change for the characteristics of the user device 104. More particularly, the service provider 110 may determine a baseline rate of change of the battery level of the user device 104, which may indicate how rapidly the battery typically is drained. Since different types of user devices 104 have different types of batteries and varying functionality, this baseline rate of change may vary based on the type of user device 104 being used to play the game 118. Moreover, for two user devices 104 within the same type or category of user device 104, the battery life of those user devices 104 may vary based on numerous factors, such as the age of the user device, the amount of data stored thereon, the amount of processes currently running, the extent of usage, and so on. As a result, the baseline measurements for the characteristics (e.g., battery level, volume level, etc.) of the user device 104 may influence the rewards that are provided to the user 102.

As described above, the game mechanics may be part of, or an addition to, a game 118. Moreover, the modules illustrated in FIG. 2 may be maintained by the content server(s) 108 and/or may be stored in the memory 114 of the user device 104. Provided that the modules are stored in the memory 122 of the content server(s) 108, the modules may cause the game mechanics to perform the operations described herein. Provided that the game 118 and the corresponding game mechanic(s) are stored on the user device 104, the game mechanic(s) can determine the current levels of the device characteristics (e.g., battery consumption, volume level, etc.). As a result, the processor(s) 112 of the user device 104 may not have to perform such operations, which may increase the efficiency of the user device 104, reduce CPU usage of the user device 104, decrease the amount of CPU time used by the user device 104 to process various instructions, and increase the available bandwidth of the user device 104.

Figure 3:
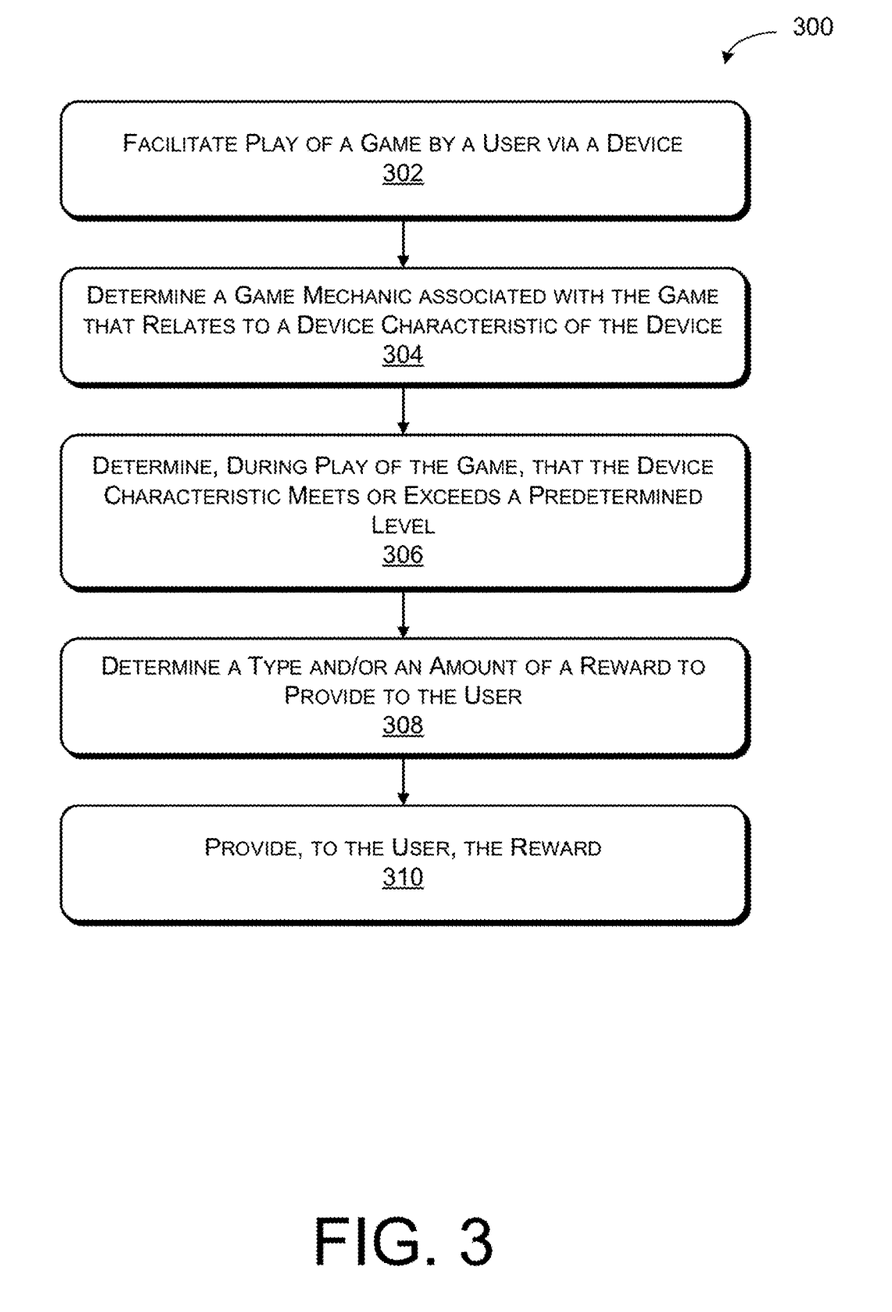
FIG. 3 is a flow diagram showing an example process of providing a reward to a user playing a game based on characteristics of a user device during play of the game.
Figure 4:
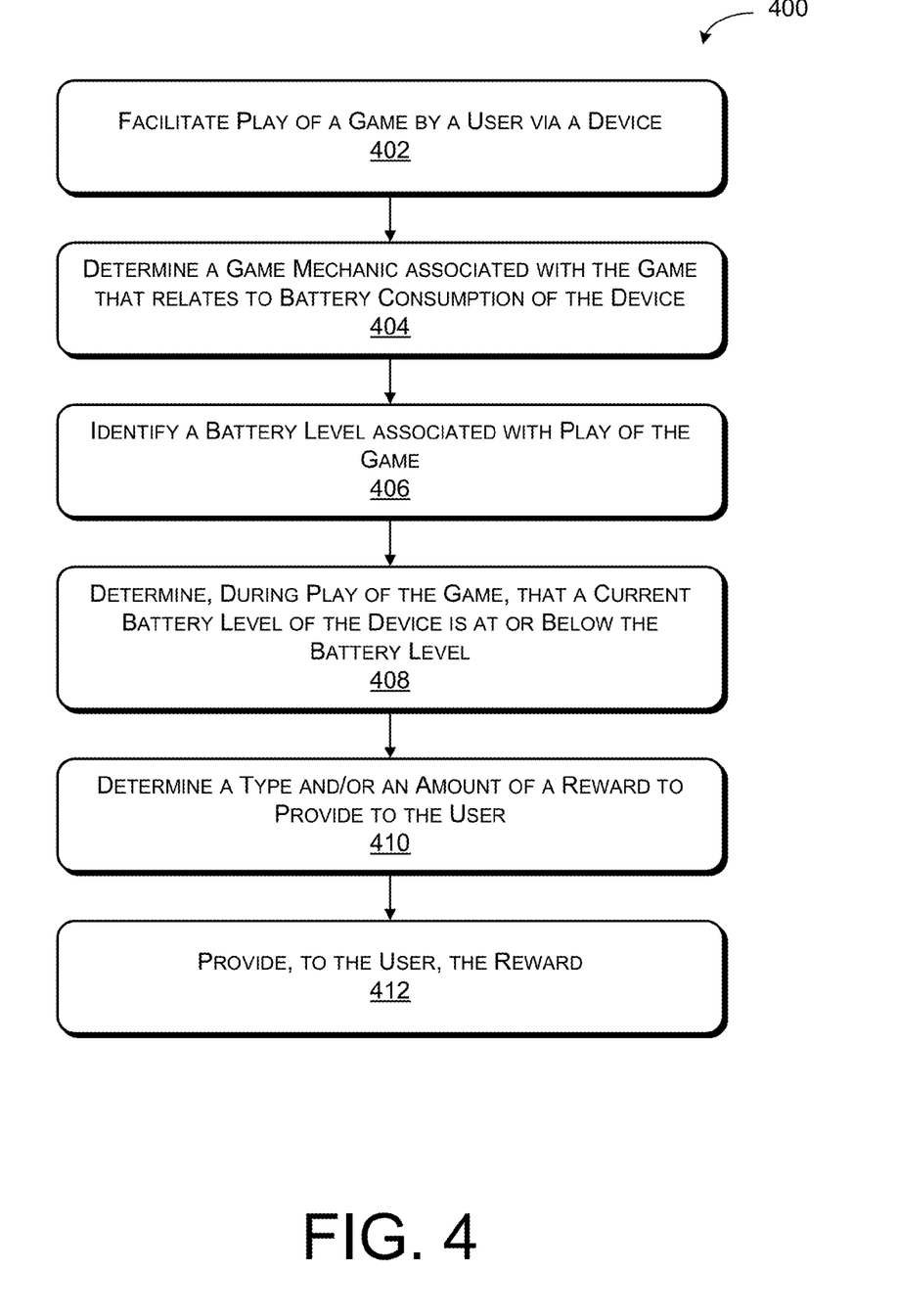
FIG. 4 is a flow diagram showing an example process of providing a reward to a user playing a game based on battery consumption of a user device being used to play the game.
Figure 5:
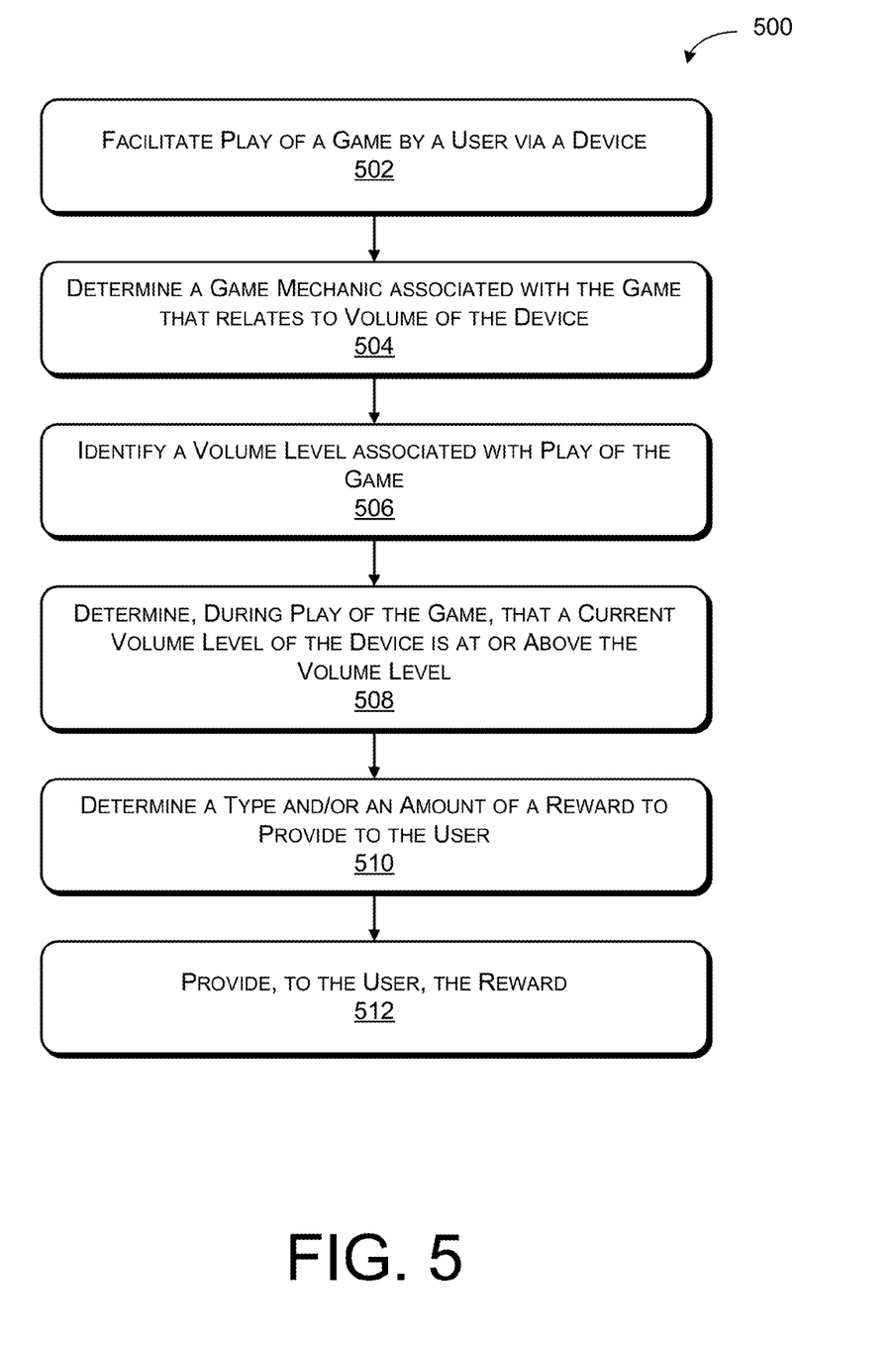
FIG. 5 is a flow diagram showing an example process of providing a reward to a user playing a game based on a volume level of a user device being used to play the game.

FIGS. 3-5 describe various example processes of providing game rewards based at least partly on characteristics associated with a user device being used to play a game. The example processes are described in the context of the environment of FIGS. 1 and 2 but are not limited to those environments. The order in which the operations are described in each example method is not intended to be construed as a limitation, and any number of the described blocks can be combined in any order and/or in parallel to implement each method. Moreover, the blocks in FIGS. 3-5 may be operations that can be implemented in hardware, software, or a combination thereof. In the context of software, the blocks represent computer-executable instructions stored in one or more computer-readable storage media that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 3 is a flow diagram illustrating an example process 300 of providing game rewards based on characteristics of a user device during play of a game. Moreover, the following actions described with respect to FIG. 3 may be performed by a server, the service provider 110, a merchant, and/or the content server(s) 108, as shown in FIGS. 1 and 2.

Block 302 illustrates facilitating play of a game by a user via a device. In various embodiments, a user 102 may play a game 118 via a user device 104. The game 118 may be stored on the user device 104, maintained by a content server 108 associated with a service provider 110, played via a site (e.g., a website), streamed to the user device 104 via a network 106, played via an application residing on the user device 104, and so on.

Block 304 illustrates determining a game mechanic associated with the game that relates to a device characteristic of the device. In particular, the game 118 may include, or may be associated with, one or more game mechanics that monitor and/or determine the current level of the device characteristic while the user 102 is playing the game 118. In various embodiments, the characteristic of the user device 104 may be related to battery consumption of the user device 104 and/or a volume level of the user device 104, for example.

Block 306 illustrates determining, during play of the game, that the device characteristic meets or exceeds a predetermined level. In various embodiments, the service provider 110 may determine predetermined levels or thresholds associated with the device characteristics. If the current level of the characteristic of the user device 104 meets or satisfies the predetermined level or threshold during play of the game 118, the user 102 playing the game 118 may receive one or more rewards.

Block 308 illustrates determining a type and/or an amount of a reward to provide to the user. More particularly, the reward may correspond to points, tokens, unlocked features, bonuses, or other value associated with the game 118. Moreover, the extent of the reward that is provided to the user 102 may be based on the particular device characteristic and/or the current level of the device characteristic while the user 102 is playing the game 118 via the user device 104. For instance, the user 102 may be provided with a more significant reward if the battery level of the user device 104 reaches a lower level while the user 102 is playing the game 118.

Block 310 illustrates providing, to the user, the reward. In various embodiments, the reward may be added to a cumulative amount of rewards previously earned while playing the game 118. In other embodiments, however, the reward may be associated with a user account or a user profile associated with the user 102. Once the reward is earned, the user 102 may receive additional rewards as a result of playing the game 118 via the user device 104.

FIG. 4 is a flow diagram illustrating an example process 400 of providing game rewards based at least partly on battery consumption of a user device during play of the game. Moreover, the following actions described with respect to FIG. 4 may be performed by a server, the service provider 110, a merchant, and/or the content server(s) 108, as shown in FIGS. 1 and 2.

Block 402 illustrates facilitating play of a game by a user via a device. In particular, a user 102 may play a game 118 via a user device 104. The game 118 may be stored on the user device 104, maintained by a content server 108 associated with a service provider 110, played via a site (e.g., a website), streamed to the user device 104 via a network 106, played via an application residing on the user device 104, and so on.

Block 404 illustrates determining a game mechanic associated with the game that relates to battery consumption of the device. In certain embodiments, the game mechanic may determine and/or monitor the battery level of the user device 104 as the user 102 plays the game 118.

Block 406 illustrates identifying a battery level associated with play of the game. That is, the service provider 110 may identify predetermined battery levels or thresholds associated with the user device 104 that may be utilized to determine whether the user 102 playing the game 118 is eligible to receive various rewards. Such battery levels or thresholds may correspond to an amount of battery remaining, an amount of battery consumed, and so on.

Block 408 illustrates determining, during play of the game, that a current battery level of the device is at or below the battery level. Moreover, if it is determined that the current battery level of the user device 104 is at or below the predetermined battery level or threshold while the user 102 is playing the game 118, the user 102 may receive a reward associated with the game 118. The user 102 may continue to receive additional rewards provided that the battery level of the user device 104 continues to decrease below a second predetermined battery level or threshold.

Block 410 illustrates determining a type and/or an amount of a reward to provide to the user. In some embodiments, the reward may be based on the current battery level of the user device 104 and/or the particular predetermined battery level or threshold that has been satisfied. For example, greater or more significant rewards may be provided when the current battery level of the user device 104 reaches a lower predetermined battery level or threshold of the user device 104.

Block 412 illustrates providing, to the user, the reward. Furthermore, the reward may be added to a cumulative amount of rewards previously earned while playing the game 118. In other embodiments, however, the reward may be associated with a user account or a user profile associated with the user 102. Once the reward is earned, the user 102 may receive additional rewards as a result of playing the game 118 via the user device 104.

FIG. 5 is a flow diagram illustrating an example process 500 of providing game rewards based at least partly on a volume level of a user device during play of the game. Moreover, the following actions described with respect to FIG. 5 may be performed by a server, the service provider 110, a merchant, and/or the content server(s) 108, as shown in FIGS. 1 and 2.

Block 502 illustrates facilitating play of a game by a user via a device. In particular, a user 102 may play a game 118 via a user device 104. The game 118 may be stored on the user device 104, maintained by a content server 108 associated with a service provider 110, played via a site (e.g., a website), streamed to the user device 104 via a network 106, played via an application residing on the user device 104, and so on. During play of the game 118, the user 102 may receive rewards as a result of the performance of the user 102 and/or as a result of various characteristics of the user device 104 while the user 102 is playing the game 118.

Block 504 illustrates determining a game mechanic associated with the game that relates to volume of the device. In various embodiments, the game mechanic may determine and/or monitor the volume level of the user device 104 while the user 102 is playing the game 118. For instance, the game mechanic may determine whether the volume of the user device 104 is turned on and/or determine the current volume level of the user device 104.

Block 506 illustrates identifying a volume level associated with play of the game. In some embodiments, predetermined volume levels or thresholds may be determined with respect to the user device 104. The predetermined volume levels or thresholds may be determined for the purpose of determining whether the user 102 is eligible to receive game rewards based on the volume level of the user device 104 while the user 102 is playing the game 118. In some embodiments, the volume level may be a result of the user 102 adjusting a volume setting associated with the user device 104, which may cause the user device 102 to output sound via one or more speakers of the user device 104 and/or one or more speakers separate from the user device 104 (e.g., headphones, a stereo receiver, etc.). For instance, the user 102 may turn on the volume of the user device, increase the volume setting of the user device 104, and/or decrease the volume setting of the user device 104 during play of the game 118.

Block 508 illustrates determining, during play of the game, that a current volume level of the device is at or above the volume level. In various embodiments, if it is determined that the current volume level of the user device 104 during play of the game 118 meets or exceeds the predetermined volume level or threshold, then the user 102 may receive a reward in conjunction with the game 118.

Block 510 illustrates determining a type and/or amount of a reward to provide to the user. In some embodiments, the reward may be based on the current volume level of the user device 104 and/or the particular predetermined volume level or threshold that has been satisfied. For example, greater or more significant rewards may be provided when the volume of the user device 104 is turned on during game play and/or when the volume level of the user device 104 reaches a higher predetermined volume level or threshold of the user device 104.

Block 512 illustrates providing, to the user, the reward. Furthermore, the reward may be added to a cumulative amount of rewards previously earned while playing the game 118. In other embodiments, however, the reward may be associated with a user account or a user profile associated with the user 102. Once the reward is earned, the user 102 may receive additional rewards as a result of playing the game 118 via the user device 104.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A mobile device comprising:
   memory;
   one or more processors; and
   one or more computer-executable instructions stored in the memory and executable by the one or more processors to:
   facilitate play of a game via the mobile device;
   determine a threshold associated with a characteristic of the mobile device, the characteristic being a volume of the mobile device and the threshold being a predetermined volume level associated with the mobile device;
   monitoring the characteristic with respect to the threshold;
   determining, during play of the game, that a current level of the characteristic satisfies the threshold, the current level of the characteristic being a current volume level of the mobile device; and
   based at least partly on the current level of the characteristic satisfying the threshold, causing a reward associated with the game to be provided.

2. The mobile device as recited in claim 1, wherein:
   the characteristic associated with the mobile device is a battery consumption of the mobile device;
   the threshold is a predetermined battery level associated with the mobile device; and
   the current level of the characteristic is a current battery level of the mobile device.

3. The mobile device as recited in claim 1, wherein the characteristic of the mobile device is associated with at least one of:
   active applications associated with the mobile device;
   media content captured with or presented by the mobile device;
   a screen brightness of the mobile device;
   an extent of user interaction with the game;
   wireless connectivity associated with the mobile device; or
   an extent of processing performed by the mobile device during play of the game.

4. The mobile device as recited in claim 1, wherein the reward is provided to at least one of:
   a user playing the game via the mobile device;
   a cumulative amount of rewards previously earned by the user; or
   a user account or a user profile associated with the user.

5. The mobile device as recited in claim 4, wherein the reward includes at least one of:
   points or tokens that are added to a cumulative amount of points or tokens previously earned by the user;
   unlocking of one or more game features that were previously unavailable or inaccessible to the user; or
   a multiplier that indicates a rate in which rewards are provided to the user.

6. The mobile device as recited in claim 1, wherein the one or more computer-executable instructions are further executable by the one or more processors to:
   determine a type of the mobile device; and
   causing the reward associated with the game to be provided based at least partly on the type of the mobile device.

7. The mobile device as recited in claim 1, further comprising:
   determining that the reward is a first reward based at least partly on a first determination that the mobile device is a mobile telephone;
   determining that the reward is a second reward based at least partly on a second determination that the mobile device is a tablet device, wherein the first reward is greater than the second reward; and
   determining that the reward is a third reward based at least partly on a third determination that the mobile device is a laptop computer, wherein the second reward is greater than the third reward.

8. A system comprising:
   memory;
   one or more processors; and
   one or more computer-executable instructions stored in the memory and executable by the one or more processors to:
   facilitate play of a game via a user device located remotely from the system;
   determine a threshold associated with a characteristic of the user device, the characteristic being a volume of the user device and the threshold being a predetermined volume level associated with the user device;
   receive, from the user device, an indication of a current level of the characteristic, the current level of the characteristic being a current volume level of the user device;
   determine, during play of the game via the user device, that the current level of the characteristic satisfies the threshold; and
   based at least partly on the current level of the characteristic satisfying the threshold, causing a reward associated with the game to be provided.

9. The system as recited in claim 8, wherein:
   the characteristic associated with the user device is a battery consumption of the user device;
   the threshold is a predetermined battery level associated with the user device; and
   the current level of the characteristic is a current battery level of the user device.

10. The system as recited in claim 8, wherein the one or more computer-executable instructions are further executable by the one or more processors to monitor the current level of the characteristic while a user associated with the user device plays the game.

11. The system as recited in claim 8, wherein the reward is based at least partly on at least one of the characteristic associated with the user device, the threshold, or the current level of the characteristic.

12. The system as recited in claim 8, wherein the one or more computer-executable instructions are further executable by the one or more processors to:
   determine a second threshold of the characteristic associated with the user device;
   determine, during play of the game via the user device, that a second current level of the characteristic satisfies the second threshold; and
   based at least partly on the second current level of the characteristic satisfying the second threshold, causing a second reward that is associated with the game and that is different from the reward to be provided.

13. The system as recited in claim 8, wherein the reward includes at least one of:
   points or tokens that are added to a cumulative amount of points or tokens previously earned by a user playing the game via the user device;
   unlocking of one or more game features that were previously unavailable to the user; or
   a multiplier that indicates a rate in which rewards are provided to the user.

14. A method comprising:
   facilitating play of a game via a user device;
   determining a threshold associated with a characteristic of the user device, the characteristic being a volume of the user device and the threshold being a predetermined volume level associated with the user device;
   determining, during play of the game via the user device, that a current level of the characteristic satisfies the threshold, the current level of the characteristic being a current volume level of the user device; and
   based at least partly on the current level of the characteristic satisfying the threshold, causing a reward associated with the game to be provided.

15. The method as recited in claim 14, wherein the characteristic includes a battery consumption of the user device, the battery consumption being associated with at least one of:
   active applications associated with the user device;
   media content captured with or presented by the user device;
   a screen brightness of the user device;
   an extent of user interaction with the game;
   wireless connectivity associated with the user device; or
   an extent of processing performed by the user device during play of the game.

16. The method as recited in claim 14, wherein the characteristic includes a battery consumption of the user device, and wherein the reward is based at least partly on the user device powering down as a result of a current battery level of the user device reaching zero.

17. The method as recited in claim 14, further comprising:
   determining a second threshold associated with the characteristic of the user device, the second threshold being a second predetermined volume level of the user device;
   determine, during play of the game via the user device, that a second current level of the user device satisfies the second threshold, the second current level of the characteristic being a second current volume level of the user device; and
   based at least partly on the second current level of the user device satisfying the second threshold, causing a second reward that is associated with the game and that is different from the reward to be provided.

18. The method as recited in claim 14, wherein the reward includes at least one of:
   points or tokens that are added to a cumulative amount of points or tokens previously earned by the user playing the game via the user device;
   unlocking of one or more game features that were previously unavailable to the user; or
   a multiplier that indicates a rate in which rewards are provided to the user.

19. The method as recited in claim 14, wherein the reward is based at least partly on at least one of the threshold or the current level of the characteristic.

20. The method as recited in claim 14, further comprising:
   determining that the reward is a first reward based at least partly on a first determination that the mobile device is a mobile telephone or a tablet device; and
   determining that the reward is a second reward based at least partly on a second determination that the mobile device is a laptop computer or a desktop computer, wherein the first reward is greater than the second reward.

* * * * *